Dec. 19, 1967   E. M. HUTCHINS   3,358,489
APPARATUS FOR FORMING BULBOUS ARTICLES
Filed Aug. 13, 1965   3 Sheets-Sheet 3
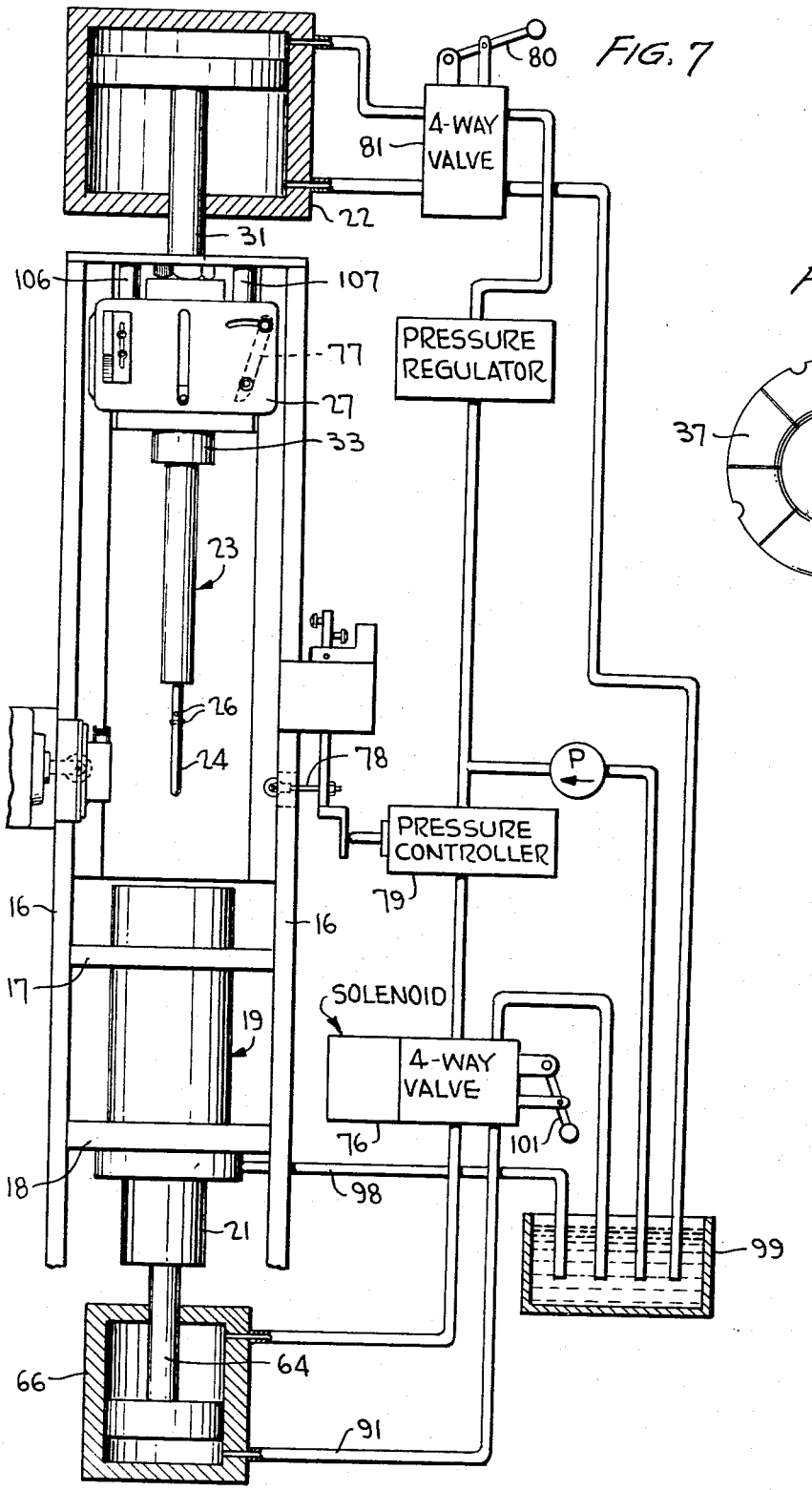

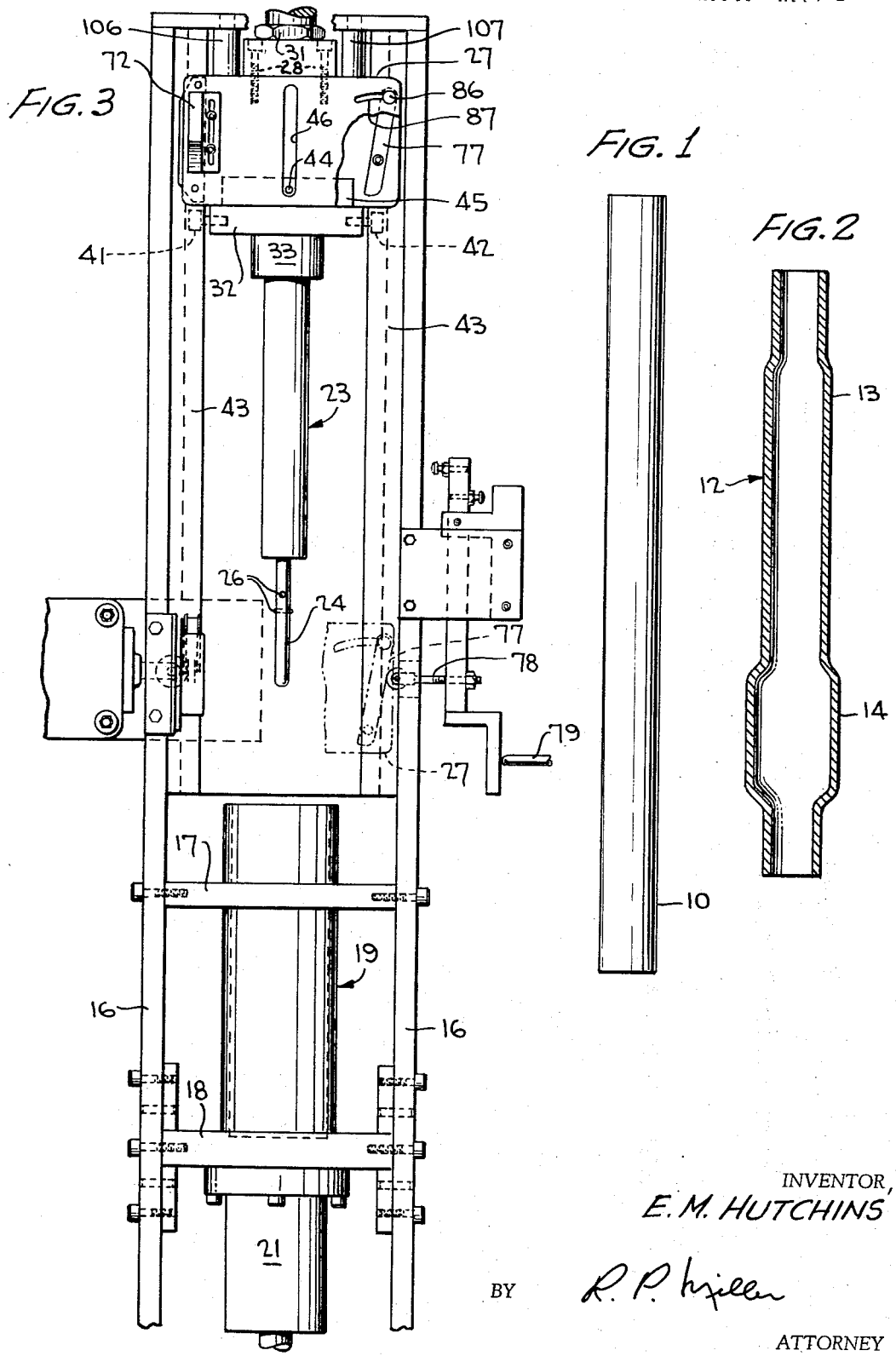

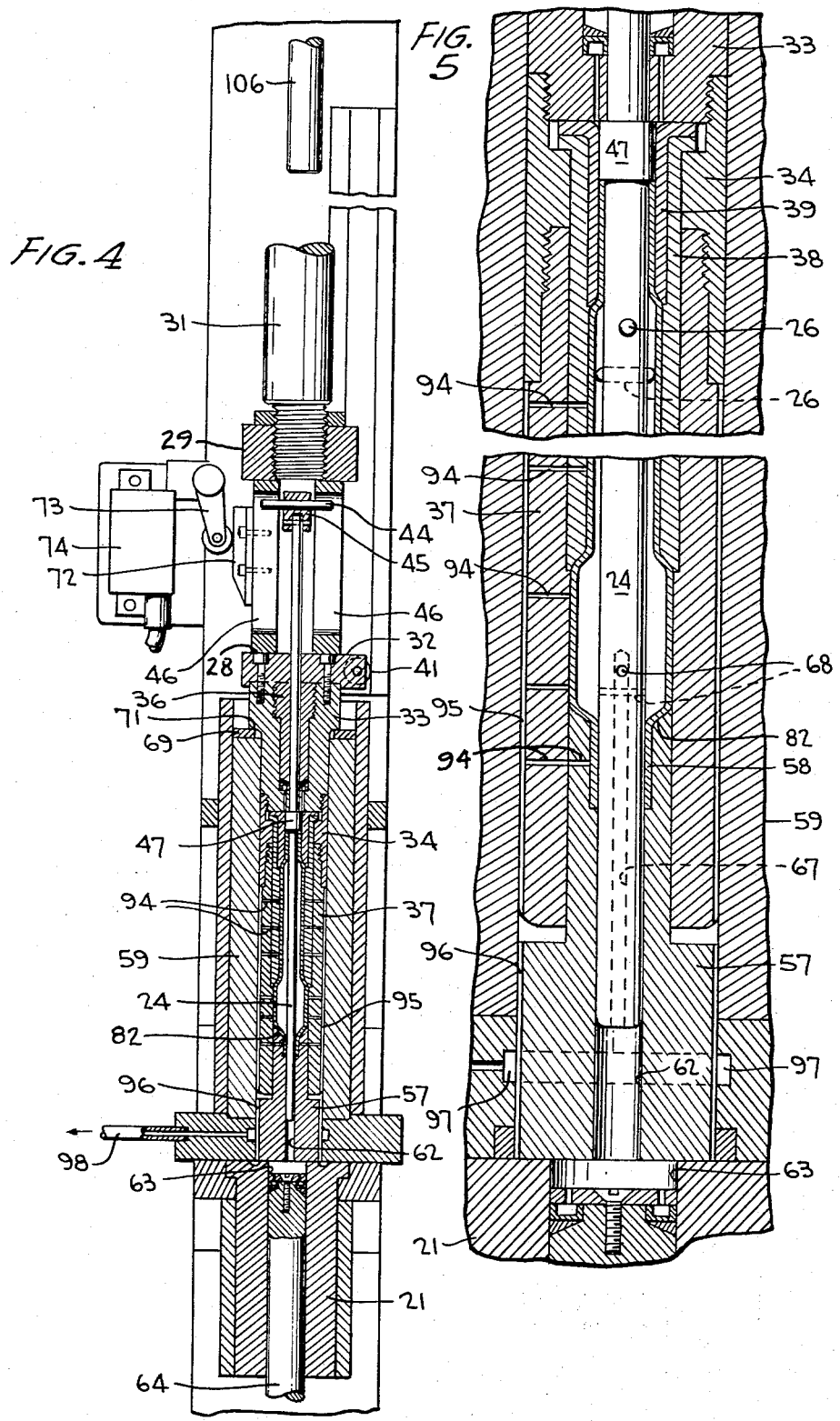

United States Patent Office 3,358,489
Patented Dec. 19, 1967

3,358,489
APPARATUS FOR FORMING BULBOUS ARTICLES
Erle M. Hutchins, Winston-Salem, N.C., assignor to Western Electric Company, Incorporated, New York, N.Y., a corporation of New York
Filed Aug. 13, 1965, Ser. No. 479,538
8 Claims. (Cl. 72—62)

ABSTRACT OF THE DISCLOSURE

This disclosure is directed to a forming apparatus for shaping hollow blanks by the telescoping engagement of cooperating dies. The apparatus structure comprises upper and lower dies slidably mounted in a telescoping relationship, a mandrel containing axial and radial passages slidably mounted in the first die for supporting a tubular blank within the die cavities of the upper and lower dies, a passage in the lower die communicating with the axial passage of the mandrel for introducing a pressurized fluid to expand the tubular blank, and a hydraulic cylinder for moving the upper die with respect to the lower die to position the mandrel and the tubular blank in the lower die and to exert a compressive force on the tubular blank during expansion thereof and maintain a constant wall thickness.

---

This invention relates to apparatus for forming bulbous articles having uniform wall thicknesses, and more particularly to facilities for shaping a tubular blank by a combination of mechanical, hydraulic, and extruding forces applied axially and internally to the blank.

In the manufacture of bulbous articles such as cable terminal sleeves, it is desirable to control the wall thickness both during the forming operation and in the final product. During the forming operation of a bulbous article from a tubular blank wherein the final product may have a number of diameters, it is necessary that the formation of thin wall sections be avoided as well as the avoidance of instances of stress concentrations due to non-uniform expansions of the stock. One type of apparatus for forming cable terminal sleeves of this type is disclosed and claimed in a copending application Ser. No. 461,121, filed on June 3, 1965, in the name of F. J. Fuchs, Jr.

An object of the invention is to provide a new and improved apparatus for forming bulbous articles having uniform wall thickness.

Another object of the invention resides in the formation of bulbous articles from tubular blanks by the simultaneous and sequential application of mechanical, hydraulic, and extruding forces both axially and internally to the tubular blank.

A further object of the invention resides in a forming apparatus wherein a first die is telescoped over a second die to provide a die cavity into which projects a hollow, movable, mandrel that functions both to apply mechanical forces to a section of tubular stock and receive pressurized fluid which is applied through passageways to radially expand the tubular stock against the walls of the die cavity.

An additional object of the invention is the provision of a pair of telescoping die members cooperating with a slidably mounted hollow mandrel for applying mechanical, hydraulic, and extruding forces to a section of tubular stock to expand this stock into a bulbous shape without formation of deleterious thin sections or the formation of detrimental stress concentrations.

With these and other objects in view, the present invention contemplates relatively moving a pair of die members into telescoping relationship to envelop a section of stock mounted on a hollow mandrel which is moved relative to one of said die members and receives pressurized fluid to shape the stock against the die members. More particularly, as the die members move into telescoping relationship, a stop on the mandrel forces the stock into one of the die members while the movement of the other die member controls the application of pressurized fluid through the hollow mandrel to expand the stock into engagement with both the die members.

Other advantages and objects of the present invention will become apparent upon consideration of the following detailed description in conjunction with the accompanying drawings; wherein:

FIG. 1 shows a view of a section of tubular stock which is to be shaped by the apparatus according to the present invention;

FIG. 2 is a cross sectional view of the shaped stock showing the bulbous contours;

FIG. 3 is a front elevational view of a forming apparatus for shaping the stock shown in FIG. 1 into the configuration shown in FIG. 2 in accordance with the principles of the present invention;

FIG. 4 is a cross sectional view taken along line 4—4 of FIG. 3 showing the details of a pair of forming dies and a mandrel together with the facilities for imparting movement to these elements;

FIG. 5 is an enlarged cross sectional view of a portion of the die members and mandrel shown in FIG. 4;

FIG. 6 is an end view of an upper die cylinder showing a segmented construction; and, FIG. 7 is a view similar to FIG. 3 showing a schematic of the hydraulic controls for operating the forming apparatus.

Referring to the drawings and particularly to FIGS. 1 and 2 wherein there is shown a tubular blank 10 that is to be fabricated into a connector sleeve 12 having bulbous sections 13 and 14. The apparatus for forming the bulbous sections is shown in the other drawings and includes facilities for applying mechanical, hydraulic, and extruding forces to the blank 10.

Attention is directed to FIGS. 3, 4, and 5 for a detailed consideration of the die elements for fabricating the sleeve 12. There is shown a housing frame 16 having cross brackets 17 and 18 for supporting a lower die assembly 19 and a hydraulic compression cylinder 21. The housing frame 16 also supports a second hydraulic cylinder 22 which controls the movement of an upper die assembly 23 and a mandrel 24. The mandrel 24 has a number of apertures for receiving rubber-like plugs 26 (see FIG. 5) which serve to support tubular blank 10 during movement of the upper die assembly 23 into the lower die assembly 19.

As shown in FIGS. 3 and 4, the upper die assembly is connected to a yoke 27 which is attached by screws 28 to a nut 29 threaded onto a screw extension of a piston rod 31 emanating from the cylinder 22. The yoke 27 is secured to a crossbar 32 which, in turn, is screw attached to a collar stop 33 having a lower threaded section screwed into an internally threaded retainer sleeve 34. Mounted within the collar stop 33 is a guide bearing 36 for the upper portion of the mandrel 24. The retainer sleeve 34 is also threaded onto and holds a multi-segment die cylinder 37 (see also FIG. 6) having a section for shaping the bulbous portion 14 of the sleeve 12. The cylinder is constructed of eight segments so that there are thin slits between the segments to permit the escape of trapped air and forming fluid. The second bulbous section 13 of sleeve 12 is formed against a pair of sleeve dies 38 and 39 having flanged sections interposed and secured between the retainer 34 and the collar stop 33.

The inner portion of the upper die assembly is shown as multisectioned, but it is to be understood that the various die cavities may be formed in a single block by a number of counterbores of various diameter to provide the die surfaces for the bulbous section 13 and 14 of the sleeve 12.

The yoke 27 is guided by a pair of rollers 41 and 42 (see FIGS. 3, 4, and 7) rotatably mounted on the extremities of the crossbar 32. These rollers 41 ride within a pair of channels 43 attached to the housing frame 16. The mandrel 24 can move relative to the upper die assembly 23 because the upper extremity of this mandrel is connected by a cross-slide 45 to a guide pin 44 that rides within a pair of slots 46 formed in the yoke 27.

The mandrel 24 is also provided with a forming and stripping shoulder stop or hub 47 which acts against the upper extremity of the blank 10 to force and move the blank into the lower die extremity and to compensate for wall thinness during the blank forming operation. This stop also serves to strip the fabricated sleeve 12 from the upper die when the upper die assembly is returned from the forming position shown in FIGS. 4 and 5 to the unload position shown in FIGS. 3 and 7.

Turning now to consideration of the lower die assembly 19 and to FIGS. 4 and 5, this assembly includes a lower pedestal-like die member 57 having a die cavity 58 for forming the lower tubular section of the sleeve 12. Surrounding this die member 57 is a cylindrical housing 59 which, in turn, is surrounded by a casing 61 attached to the brackets 17 and 18. The lower die member 57 includes a passageway 62 for receiving fluid forced from a compression chamber 63 formed in the lower cylinder 21. A piston rod 64 driven by fluid admitted to a cylinder 66 (see FIG. 7) compresses the fluid in the chamber 63 and forces this fluid through the passageway 62 into a passageway 67 formed in the mandrel 24. The mandrel 24 is also provided with radial passageways 68 to permit the fluid to pass inside of the blank 10 to deform it into the bulbous shapes against the die cylinder 37 and the sleeve dies 38 and 39.

The housing 59 is secured to and supports a washer stop 69 which engages a shoulder 71 formed on the collar stop 33 to limit the downward movement of the upper die assembly 23. The spacing between the inner surface of the housing 59 and the outer surface of the pedestal die member 57 is sufficient to snuggly receive the lower portion of the cylindrical die member 37.

Attached to the yoke 46 is a switch actuator cam 72 for moving a switch operator arm 73 to close a switch 74 which, in turn, operates a solenoid valve 76 with manual reset (see FIG. 7) to control the application of hydraulic fluid to the cylinder 66 which functions to apply a compressive force to the fluid in the compression chamber 63.

In addition, the yoke 27 supports an adjustable pivot cam 77 (see FIGS. 3 and 6) to move a follower 78 that controls a pressure controller 79 to accordingly increase pressure of the fluid applied to operate the cylinder 66 and piston 64 arrangement. It may be understood that as the upper die assembly 23 moves down, the cam 73 operates the switch 74 to initiate the application of fluid to the lower portion of cylinder 66 and thus the cam 77 acts against the follower 78 to successively increase the pressure of the fluid applied to operate piston 64 whereupon increased pressure is applied to the fluid in the compression chamber 63. This increase in pressure of the fluid within the chamber 63 is also impressed on the fluid emanating from the passageways 68 to deform the tubular blank 10.

Considering now the over-all operation, with particular reference to FIGS. 3 and 7, the attending operator will load a blank 10 on the projecting mandrel 24. The rubber-like plugs 26 will hold the blank in position. Next, the operator will actuate a handle 80 of a four-way valve 81 to admit pressurized fluid to the upper cylinder 22 whereupon piston rod 31 proceeds to move downwardly advancing the upper die assembly 23 into the lower die assembly 19. The upper die cylinder 37 moves within the housing 59 and telescopes over the pedestal die member 57, that is, the pedestal die member 57 is received within the opening in the lower portion of the cylindrical die member 37.

The advancing blank 10 first engages a shoulder 82 (see FIGS. 4 and 5) formed on the lower die 57 to hold the blank 10 and the mandrel 24 stationary while the movement of the upper die assembly 23 continues. The relative movement between the upper die assembly and the mandrel is permitted by the pin 44 and slot 46 connection between the mandrel and the upper die assembly. The blank 10 is held because it is slightly larger in diameter than the diameter of the die cavity 58. This continued movement of the upper die assembly advances the lower face of the collar stop 33 into engagement with the upper surface of the now stationary shoulder stop 47. The mandrel 24 is now advanced with the upper die assembly 10 and the shoulder stop 47 exerts a force on the blank to force the lower portion of the blank into the die cavity 58. This forming operation of the lower portion of the blank 10 is, in reality, a reverse drawing or extruding operation.

As the lower portion of the blank is being forced within the cavity 58, the cam 72 acts against the switch operator arm 73 to close the switch 74 and, as a result, energizes the solenoid valve 76. Fluid then passes through a conduit 91 to drive the piston 64 in an upward direction to apply a large compressive force to the fluid within the compression chamber 63. This pressurized fluid passes through the passageway 67 and the passageways 68 to act against the inner surface of the blank 10. The blank is expanded into engagement with the sleeve dies 38 and 39 and the inner wall of the cylindrical die member 37 to form the bulbous sections 13 and 14 of the sleeve 12.

Following operation of the switch 74, the upper die 23 continues to advance an additional predetermined amount to apply mechanical axial forces through the shoulder stop 47 and the upper end of the blank 10 so that the combination of the increased hydraulic pressure and the axial mechanical force on the blank control the deformation of the blank to provide a uniform wall thickness. During this movement, cam 77 moves the cam follower roller 78 to further open the pressure controller 79 to increase the pressure applied to the cylinder 66 whereupon the fluid in the chamber 63 is further pressurized. This increased pressurization is utilized to form the blank 10 into its final shape. The upper die assembly 23 continues to move downwardly until the shoulder 71 on the collar stop 33 engages the washer stop 69.

The pressure can be adjusted to insure that the blank is formed without any thin spots or stressed portions. This pressure adjustment may be accomplished by loosening a screw bolt 86 mounted in slot 87, pivoting the cam 77, and then retightening the bolt 86.

It will be noted that die cylinder 37 and the sleeve die 38 are provided with circumferential spaced arrays of radial bores 94 to permit air and fluid trapped between the blank 10 and the die surfaces to escape and pass through a narrow passageway formed by grooves 95 longitudinally extending along the outer surfaces of the segments of the die cylinder 37 and the inner surface of the cylindrical housing 59, and then through longitudinal grooves 96 formed in the outer surface of the pedestal die 57. The escaping fluid moves from the grooves 96 to a connecting annular passageway 97 coupled to a runoff line 98 leading to a fluid reservoir 99. The multi-segment construction of the cylindrical die member 37 (see FIG. 6) provides a plurality of thin longitudinal slits 100 between the segments to also permit escaping fluid to pass into the connecting annular passageway 97 leading to a runoff line 98. The multisegment construction of the cylindrical die member 37 also imparts resilience to over-all assembly which permits the die member 37 to readily advance within the housing 59 and over the pedestal die member 57.

The pedestal die member 57 is likewise provided with an array of circumferential spaced radial bores for allowing the trapped air and fluid to pass from between the outer surface of the lower portion of the tubular blank 10 and the wall of the die cavity 58. This trapped fluid passes through aligned bores 94 in the die cylinder 37 or through the slits 100 to the longitudinal grooves 95 and 96 and then to the annular passageway 97 leading to the runoff line 93.

To withdraw the fabricated sleeve 12 from the mandrel 24, the valve 76 is reversed by operation of a switch release and shift handle 101 to withdraw the piston rod 64 and; hence, relieve the pressure on the hydraulic forming fluid. Next, the handle 80 is operated to reverse the fluid applied to the cylinder 22 to withdraw the upper die assembly 23. At this time, the mandrel 24 and the fabricated sleeve 12 are lodged within the upper die assembly 23. The mandrel 24 and the cross-slide 45 move with the upper die assembly 23 until the cross-slide engages a pair of stops 106 and 107 (see FIGS. 3 and 7) whereupon the die assembly 23 moves relative to the mandrel 24. The shoulder stop 47 is now stationary; hence, the fabricated sleeve 12 is pushed from within the upper die assembly. The attending operator may now slide the sleeve from the supporting rubber plugs 24.

It is to be understood that the above-detailed arrangement of apparatus and construction of elemental parts are simply illustrative of an application of the principles of the invention and many other modifications may be made without departing from the invention.

What is claimed is:

1. In an apparatus for expanding a tubular blank,
a pair of dies mounted in telescoping relationship. each of said dies having a die cavity formed therein movable into communication with each other,
a mandrel slidably mounted in a first one of said dies for supporting said tubular blank, said mandrel having communicating axial and radial passageways,
means for imparting relative movement to said dies to move said mandrel supported tubular blank into engagement with said other die whereupon said mandrel slides within said first die,
means for limiting said sliding movement of said mandrel to force said tubular blank against said other die, and
means responsive to said relative movement of said dies and rendered effective upon operation of said limiting means for applying pressurized fluid through said axial and radial passageways to expand said tubular blank on said mandrel.

2. In an apparatus for expanding a tubular blank,
a pedestal die having a first die cavity communicating with a passageway extending therethrough,
a cylindrical die member having an opening for receiving the pedestal die therein and a second die cavity,
a mandrel slidably mounted to extend into said cylindrical die member cavity for receiving and supporting said tubular blank,
said mandrel having passageways extending therethrough and terminating at one end inside the tubular blank supported on the mandrel, and at the other end in the axial terminus of the mandrel,
means for advancing said die member over said pedestal die and advancing said mandrel to move said tubular blank into engagement with the walls of said first die cavity whereupon said die member moves relative to said mandrel,
means for limiting said relative movement to force and extrude said tubular blank into said second die cavity while moving said mandrel into said pedestal die passageway, and
means responsive to said movement of said die member for forcing fluid through said passageways in said pedestal die and said mandrel to expand said blank into engagement with the walls of said second die cavity.

3. A forming apparatus which comprises,
a first cylindrical forming member having a first die cavity,
a second forming member having an opening extending from a first end and running to a second cavity, said opening having a diameter sufficient to receive the first forming member,
a mandrel slidably mounted through the second end of said second forming member and projecting through said second cavity, said opening projecting beyond said first end for receiving a section of stock,
said mandrel having a passageway running from the projecting end thereof to a plurality of radially extending passageways,
means for advancing said second forming member to receive said first forming member within said opening and to position said mandrel within said first die cavity,
said first forming member having a die surface for engaging said stock to hold said stock and mandrel stationary while said second forming member moves over said first forming member,
means for limiting the sliding movement of said mandrel relative to said second forming member to again advance said mandrel to force said stock against said die surface in the first forming member, and
means actuated in accordance with the advance of said second die member for applying pressurized fluid through said passageways in said mandrel to force said stock against the walls of said die cavities.

4. In an apparatus for forming a bulbous article from a tubular blank,
a hollow mandrel having radial passageways extending from within said mandrel to the peripheral surface thereof for receiving said tubular blank,
a first die member having die apertures therein,
means for slidably mounting said mandrel on said die member to extend through said die aperture, and beyond said first die member,
a second die member having a die cavity in alignment with said mandrel and having a diameter greater than said mandrel, but less than the diameter of said tubular stock,
means for advancing said first die member to move said mandrel and said tubular stock into engagement with said second die member whereupon said second member moves relative to said mandrel to advance over said tubular stock,
a pushing hub on said mandrel engaging said tubular stock to axially force and extrude the end of said stock into the space between said mandrel and the walls of the cavity in said second die member,
a stop on said first die member for engaging said pushing hub after a predetermined relative movement to again advance the mandrel with the first die member, and
means rendered effective upon movement of said mandrel into said die cavity in said second die member for forcing fluid through said hollow mandrel and through said radial passageways to force said tubular stock against the walls of the die aperture in said first die member.

5. In an apparatus for forming a tubular blank into a bulbous article,
a frame,
a pedestal die member mounted on said frame and having a bulbous die cavity therein,
a slotted yoke having rollers thereon for riding on said frame toward said pedestal die member,
a cylindrical die assembly mounted on said yoke and having a bulbous die cavity communicating with an axial opening to receive said pedestal die member,
a mandrel slidably mounted in said cylindrical die assembly, said mandrel having communicating axial and radial passageways,
a crossbar attached to said mandrel,
a pin extending through said crossbar into said slotted yoke to limit movement of the mandrel beyond said cylindrical die assembly for positioning said mandrel to receive a tubular blank,
means for moving said die assembly over said pedestal die member to engage said blank and move said mandrel relative to said die assembly and said yoke,
means connected to said yoke rendered effective after a predetermined relative movement of said mandrel for again advancing the mandrel with the yoke and die assembly,
means rendered effective in response to the advance of said die assembly and yoke for applying fluid through said axial and radial passageways to expand said tubular blank within said bulbous die cavities,
means for withdrawing said yoke and die cylinder to withdraw the mandrel and bulbous article from said pedestal die cavity, and
means for engaging said crossbar during said withdrawing of said mandrel to strip the bulbous article from the bulbous die cavity formed in the cylindrical die member.

6. In an apparatus for expanding a tubular blank,
a pedestal die having a first die cavity formed therein,
said pedestal die having a plurality of radial bores formed therein to communicate the first die cavity with the outer surface thereof,
a movable die member having a second die cavity for receiving a portion of said pedestal die to position said first and second die cavities in coextensive relationship,
said movable die member having radial bores formed therein,
means for advancing said die member to receive said pedestal die,
means for supporting said tubular blank within said first and second die cavities,
means responsive to said advance of said die member for impressing pressurized fluid within said blank to expand said blank into engagement with the walls of said die cavities, and
means for collecting fluid forced around said tubular blank and through said bores.

7. In an apparatus for forming bulbous articles from tubular stock,
a sleeve-like hollow die having a plurality of longitudinal slits running from a forward end thereof,
a second die having an outer diameter equal to the inner diameter of the forward end of the sleeve-like die, said second die having a die cavity and a plurality of radial holes running from said die cavity,
means for moving said sleeve-like hollow die over said second die,
a hollow mandrel slidably mounted on and projecting into said sleeve-like die for receiving said tubular stock, and for advancing said stock into engagement with said second die member, said hollow mandrel having radial passageways running to the outer surface thereof,
a stop limiting slidable movement of said mandrel on said sleeve-like die,
means on said mandrel for axially forcing said stock into said second die,
means for forcing fluid into said hollow mandrel to expand said stock against the walls of said second die cavity in said second die whereupon fluid moves around said tubular stock through said longitudinal slits and said radial holes, and
means surrounding both said dies for collecting said escaping fluid.

8. In a press mechanism for bulging an intermediate section of a tube within a forming cavity,
a frame,
an open end cylindrical first die member movably mounted on said frame having,
    a passageway threthrough,
    a first cavity forming a shoulder with said passageway,
    a contoured second cavity communicating with said first cavity,
    a first set of bleed bores extending from said first and second cavities to the exterior of said first die member,
    a plurality of slits,
a pedestal second die member fixed to said frame and mounted to be positioned within the open end of said first die member for enclosnig said first and second cavities,
    a bore therethrough,
    a shoulder projecting into said bore for abutting one end of said tube,
    a contoured end running from said shoulder to said second cavity to form a third cavity,
    a plurality of longitudinal slits in said first die member,
a mandrel movably mounted in said first and second die members for supporting said tube within said cavities, said mandrel having,
    an abutment thereon for engaging the other end of said tube within the passageway extending through the first die member,
    a fluid passageway therein for communicating fluid from said second die member bore to the interior surface of said tube,
means for supplying fluid to said interior surface and for pressurizing said fluid to bulge said tube into said cavities forcing any fluid trapped in said cavities out through said bleed bores and said slits to enable said tube to expand into engagement with said die members,
means for moving said first die member to longitudinally force said tube into said third die cavity,
a cam movable with said first die member having a predetermined contour, and
means responsive to the contour of said cam for controlling said fluid supplying means to increase the pressure applied by said fluid to the interior of said tube.

References Cited
UNITED STATES PATENTS

| | | | |
|---|---|---|---|
| 788,119 | 4/1905 | Pope | 72—58 |
| 1,448,457 | 3/1923 | Lidell | 72—61 |
| 2,331,430 | 10/1943 | Shoemaker | 72—58 |
| 2,718,048 | 9/1955 | Sedgewick | 72—54 |
| 2,811,941 | 11/1957 | Conrad | 72—58 |

CHARLES W. LANHAM, *Primary Examiner.*